Patented Sept. 21, 1926.

1,600,743

UNITED STATES PATENT OFFICE.

HERMANN STAUDINGER, OF ZURICH, RICHARD TOBLER AND ROBERT STOCKER, OF BASEL, JAKOB MÜLLER, OF MUNCHENSTEIN, NEAR BASEL, AND ARMIN BUCHER, OF BASEL, SWITZERLAND, ASSIGNORS TO THE FIRM, SOCIETY OF CHEMICAL INDUSTRY IN BASLE, OF BASEL, SWITZERLAND.

HALOGENATED INDIGOID DYESTUFFS.

No Drawing. Original application filed November 24, 1923, Serial No. 676,858, and in Switzerland December 7, 1922. Divided and this application filed October 28, 1925. Serial No. 65,484.

The instant application, which is a division of our application Serial No. 676,858, filed November 24, 1923, relates to new halogenated indigoid dyestuffs. The invention comprises the new dyestuffs, as well as the material dyed with these dyestuffs.

It has been found that indigoid dyestuffs are obtained by reacting with compounds of the general formula:

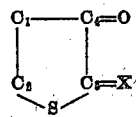

wherein $C_1$ and $C_2$ denote two carbon atoms of a naphthalene nucleus in ortho-position to each other, $C_1$ being a $\beta$-carbon atom, and wherein $C_3$ denotes a carbon atom to which there are attached exchangeable radicals $x$, such as O, two halides, one anil, $H_2$, on reactive compounds of the general formula:

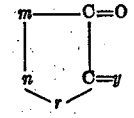

wherein $y$ denotes an exchangeable group, such as O, two halides, one anil, $H_2$, and wherein $m$, $n$, and $r$ denote atoms or residues of which two are carbon atoms adjacent to each other which at the same time belong to a ring of the naphthalene series, and of which the third atom may be a C or a S atom.

As compounds of the general formula:

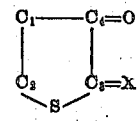

there may be mentioned the 1:2- and 2:3-thionaphthisatins, the 1:2- and 2:3-naphththioindoxyls, their halides and anils, as well as the halogen substitution products of these compounds.

As compounds of the general formula:

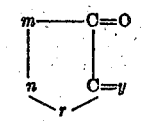

there may be mentioned the thionaphthisatins, naphththioindoxyls, acenaphthenequinones and acenaphthenones.

The reactions which take place are illustrated by the following equations:

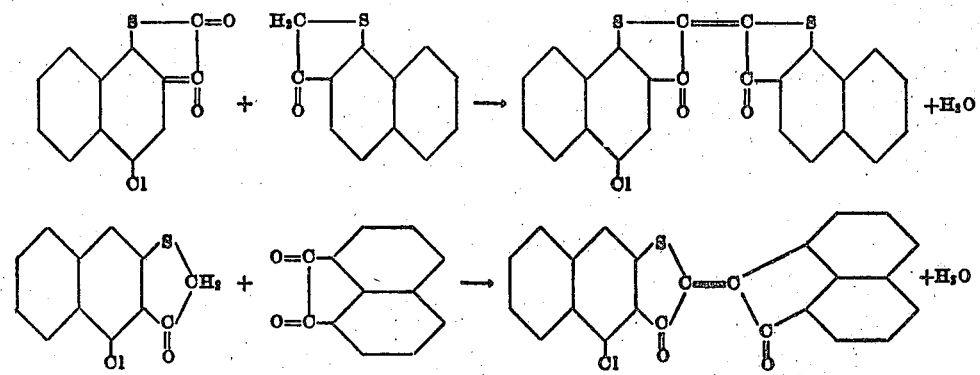

All of these new dyestuffs are characterized by the symmetrical grouping

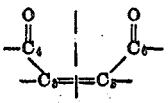

the first member of which is attached by the carbon atom $C_2$ to the sulfur atom of a thionaphthol nucleus and by the carbon atom $C_4$ to the same thionaphthol by means of a $\beta$-carbon atom in ortho-position to the sulfur atom, and in the second member of which $C_5$ and $C_6$ belong to any five-membered condensed cyclic complex.

The dyestuffs thus obtained may be further halogenated.

The shades and properties of some of the dyestuffs obtained according to the present invention are given in the table hereinafter.

*Example.*

5000 parts of alcohol, 332 parts of 2-(4'-dimethyl-amino)-anil of the 2:3-thionaphthisatin, and 200 parts of 2:3-naphththioindoxyl are boiled for a short time in a reflux apparatus and the reaction product is filtered and dried. The dyestuff thus obtained forms a bluish-green powder, dissolving in concentrated sulfuric acid with green coloration. It yields with hydrosulfite and caustic soda solution a brown-orange vat dyeing cotton very fast bluish-green tints.

396 parts of the dyestuff thus obtained are introduced into a solution containing 352 parts of bromine in 8000 parts of nitrobenzene. The reaction mixture is kept for some hours at ordinary temperature and then heated slowly, while stirring, to 140–150° C. in an oil bath, until the bromine has disappeared. After cooling the dyestuff is filtered, washed with alcohol, and dried. It forms in a dry state a greenish-blue powder, dissolving in concentrated sulfuric acid with green coloration, yielding an orange-brown vat from which cotton is dyed pure and very fast blue tints.

The formula of the new dyestuff corresponds most probably with the formula of dyestuff No. XV of the table.

| No. | Coupling component I. | Coupling component II. | Color of the dyestuff. | Color in concentrated $H_2SO_4$. | Color of vat. | Color of soaped dyeing. |
|---|---|---|---|---|---|---|
| I | 4-chloro-1:2-thionaphthisatin | 1:2-naphththioindoxyl | Green-black | Violet | Green-yellow | Gray. |
| II | p'-dimethylamino-anil of 2:3-thionaphthisatin. | Acenaphthenone and mono-bromination. | Red | Green | Brown-orange | Red. |
| III | ...idem... | 2:3-naphththioindoxyl and mono-bromination. | Greenish-blue | Green | Orange | Blue. |
| IV | ...idem... | 2:3-naphththioindoxyl and di-bromination. | ...id... | ...id... | ...id... | Pure blue. |
| V | 1-chloro-2:3-thionaphthisatin | Acenaphthenone | Blue-red | Green | Brown-yellow | Heliotrope. |
| VI | p'-dimethylamino-1-chloro-2:3-thionaphthisatin-anil. | ...idem... | ...id... | ...id... | ...id... | Id. |
| VII | 1-bromo-2:3-thionaphthisatin | 1:2-naphththioindoxyl | Brown-black | Olive-green | Reddish-yellow. | Reddish-violet. |
| VIII | ...idem... | 2:3-naphththioindoxyl | Blue-green | Green | Orange | Greenish-blue. |
| IX | ...idem... | 2:3-naphththioindoxyl and bromination. | ...id... | ...id... | ...id... | Pure blue. |
| X | 1:2-naphththioindoxyl | Acenaphthene-quinone and bromination. | Dark brown | Green | Orange-brown. | Brown. |
| XI | 4-chloro-1:2-naphththioindoxyl | 4-chloro-1:3-thionaphthisatin | Gray-blue | Violet-red | Yellow | Blue. |
| XII | ...idem... | Acenaphthene-quinone | Red | Green | Yellow | Red-brown. |
| XIII | 1-chloro-2:3-naphththioindoxyl | ...idem... | Bluish-red | Green | Brown-orange. | Bluish-red. |
| XIV | 8-chloro-2:3-naphththioindoxyl | ...idem... | Deep red | Deep green | Orange-brown. | Bluish-red. |
| XV | 1-bromo-2:3-naphththioindoxyl | 1-bromo-2:3-thionaphthisatin | Violet | Olive-green | Olive-brown | Blue. |

The formula of the dyestuff No. VII is:

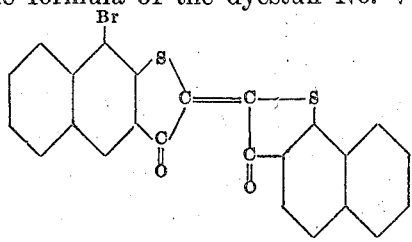

The formula of dyestuff No. X is the following:

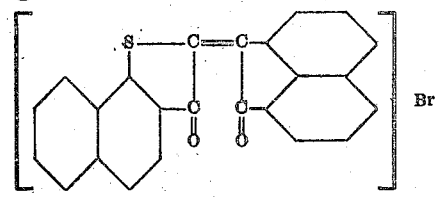

The formula of dyestuff No. XII is the following:

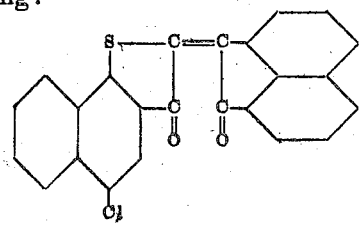

The formula of dyestuff No. XV is the following:

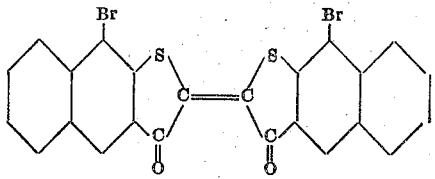

What we claim is:

1. As new products the halogenated indigoid dyestuffs which are characterized by the symmetrical atom grouping:

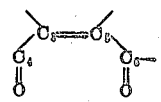

the first member of which is attached by the carbon atom $C_3$ to the sulfur atom of a thionaphthol nucleus and by the carbon atom $C_4$ to a $\beta$-carbon atom in ortho-position to this sulfur atom, and the second member of which belongs to a five-membered ring in which one member may be a carbon or a sulfur atom and of which at least two carbon atoms belong to a naphthalene nucleus, which products form dark red to blue and greenish-black powders, dissolving in sulfuric acid of 98 per cent strength with red violet to green and olive coloration, yielding with hydrosulfite and caustic soda solution greenish-yellow to brownish-orange vats which dye cotton brown to bluish-red and greenish-blue tints which are fast.

2. As new products the halogenated indigoid dyestuffs corresponding with the general formula:

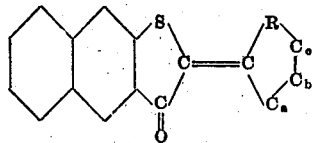

wherein the naphthalene nucleus is halogenated, R meaning S or C, and wherein at least two of the carbon atoms $C_a$, $C_b$ and $C_c$ adjacent to each other belong to a naphthalene nucleus, which products form brown to red and bluish-red powders, dissolving in sulfuric acid 98 per cent strength with green coloration, yielding yellow to brown-yellow, brown-orange and orange-brown vats which dye cotton blish-red to heliotrope, greenish-blue and pure blue tints which are fast.

3. As new products the halogenated indigoid dyestuffs corresponding with the general formula:

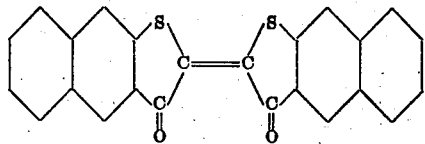

wherein both naphthalene nuclei are halogenated, which products form violet and green-blue powders, dissolving in sulfuric acid of 98 per cent strength with brown to green colorations, yielding with hydrosulfite and caustic soda solution orange to brown-orange and olive-brown vats which dye cotton fast blue tints.

4. As new products the halogenated indigoid dyestuffs corresponding with the general formula:

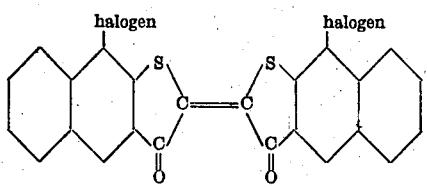

which products form violet and green-blue powders, dissolving in sulfuric acid of 98 per cent strength with brown to green colorations, yielding with hydrosulfite and caustic soda solution orange to brown-orange and olive-brown vats which dye cotton fast blue tints.

5. Material dyed with the dyestuffs of claim 1.
6. Material dyed with the dyestuffs of claim 2.
7. Material dyed with the dyestuffs of claim 3.
8. Material dyed with the dyestuffs of claim 4.

In witness whereof we have hereunto signed our names this 2nd day of October 1925.

HERMANN STAUDINGER.
RICHARD TOBLER.
ROBERT STOCKER.
JAKOB MÜLLER.
ARMIN BUCHER.